BANDWIDTH REDUCTION TECHNIQUE FOR ANALOG SIGNALS

Filed May 22, 1968

INVENTORS
ALBERT MACOVSKI
JAMES R. WOODBURY
BY Lindenberg & Freilich
ATTORNEYS

United States Patent Office 3,538,246

Patented Nov. 3, 1970

3,538,246

BANDWIDTH REDUCTION TECHNIQUE FOR ANALOG SIGNALS

Albert Macovski, Palo Alto, and James R. Woodbury, Los Altos, Calif., assignors, by mesne assignments, to Southern Pacific Transportation Company, San Francisco, Calif., a corporation of Delaware Filed May 22, 1968, Ser. No. 731,162
Int. Cl. H04b *1/66*; H04n *1/40*
U.S. Cl. 178—6 6 Claims

ABSTRACT OF THE DISCLOSURE

A modified duobinary encoding technique is employed for reduction in bandwidth. However, instead of only digital information being conveyed, the transmitted signals are permitted to vary in amplitude so that analog information is provided.

BACKGROUND OF THE INVENTION

Field of the invention

This invention relates to bandwidth reduction systems of the type suitable for use in facsimile transmission, and more particularly to improvements wherein digital bandwidth reduction techniques are employed for transmitting analog information.

Description of the prior art

In an article published on Mar. 22, 1963, in Electronics by Adam Lender entitled "Faster Digital Communications With Duobinary Techniques," there is described a transmission system for reducing bandwidth by one-half by converting a random sequence of binary digits into a correlated train of digits according to duobinary coding rules, where binary zero remains as zero, binary one assumes either a positive polarity or a negative polarity, each of equal magnitude, depending on the number of intervening zeros between the ones. The polarity of the first "one" in a digit train is arbitrary. The polarity of the next "one" is the same as the polarity of the preceding "one," if the number of intervening zeros is even. The polarity of the next "one" is opposite to the polarity of the preceding "one" if the number of intervening zeros is odd. And the polarity of the next "one" is the polarity of the preceding "one" if there are no intervening zeros.

In an application by James R. Woodbury, Ser. No. 700,081, filed Jan. 24, 1968, and entitled "Bandwidth Reduction Coding Technique," there is described an arrangement for reducing bandwidth required for transmitting an analog pulse signal train by processing the train of non-synchronous binary signals, such as those developed by applying the output of a facsimile scanner to a threshold device, so that these signals, which are in the form of a plus one or a zero signal, have every other "one" pulse inverted. The result is a three level signal (plus one, zero, or minus one) which never undergoes a transition from plus one to minus one, or from minus one to plus one.

Gray level signals are represented by mixing an AC signal with the output obtained from the scanner at the transmitter. The frequency of this AC signal is determined by the bandwidth of the communication channel. Since the amplitude of the analog signal produced by the photomultiplier in response to gray copy is less than in response to black copy, the effect of the added AC signal is to vary or modulate the gray signal amplitude at the AC signal frequency, which, when passed through the threshold circuit results in a rapidly occurring series of narrow "one" signals. These will appear as gray, when reproduced at the receiver.

SUMMARY OF THE INVENTION

In accordance with this invention, there is employed the technique of inverting each succeeding pulse in a train of pulses derived by scanning copy, but the gray scale information is preserved by preserving the amplitude level of each of these pulses as derived from the photomultiplier scanning device. In the transmission of analog signals, such as those produced by scanning facsimile copy, most of the bandwidth requirements of a band limited communication channel are due to rapid transitions in the electrical signal which are caused by sharp edges in the original copy. The technique described in essence, encode the high frequency components of the analog signal and at the same time the low frequency gray scale information is preserved in the coded signal. The result is that both the sharp edges and the gray scale information are recoverable at the receiver without any increase in the complexity of the transmitter, or the receiver.

DESCRIPTION OF THE PREFERRED EMBODIMENTS

Figure 1:
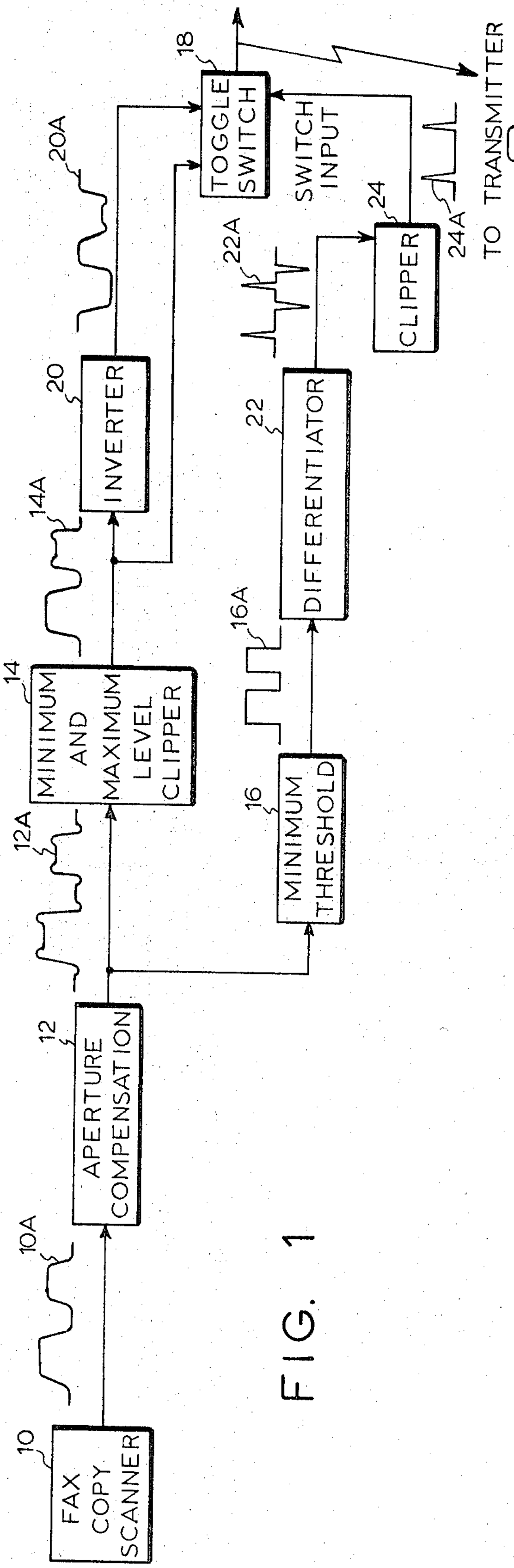
FIG. 1 is a block schematic diagram of the apparatus in accordance with this invention, which is present at a transmitter.
Figure 2:
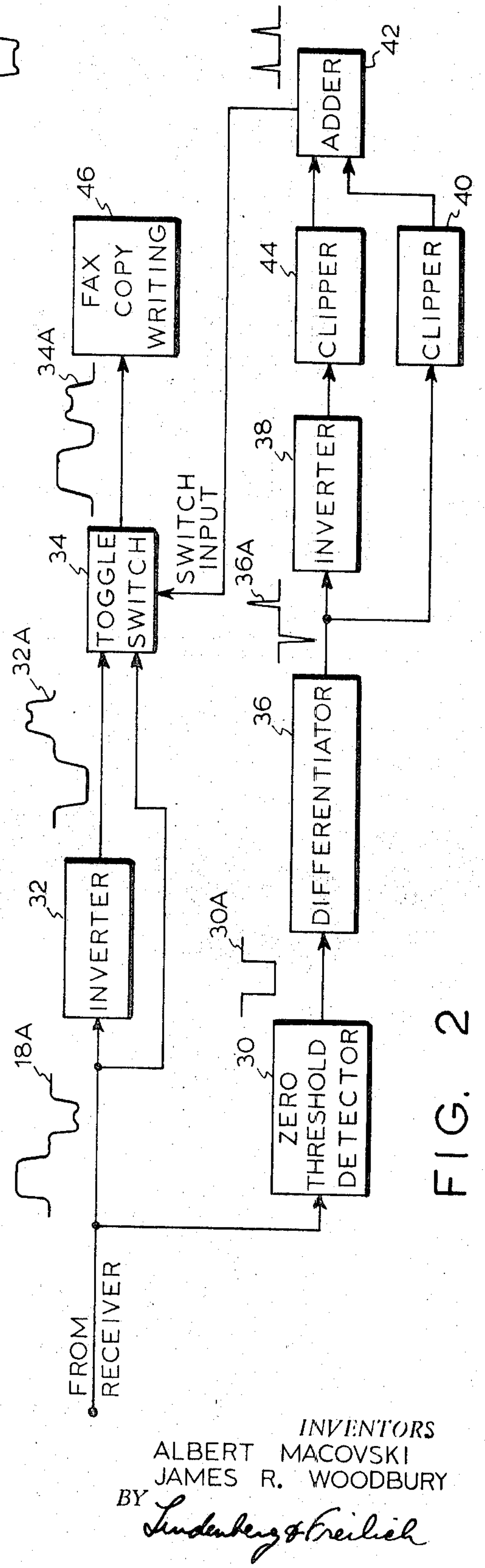
FIG. 2 is a block schematic diagram of the apparatus, in accordance with this invention which is required at a receiver.

Referring now to FIG. 1, the output of the photomultiplier which is a facsimile copy scanner 10, at a transmitter, is connected to an aperture compensation circuit 12 for the purpose of accentuating high frequency components and edges. Thus, the wave form 10A, representing two successive signals which have been generated as a result of scanning copy, is converted to the wave form 12A by the operation of the aperture compensation circuit.

The output of the aperture compensation circuit 12 is applied to a minimum and maximum level clipper circuit 14, which is a well known circuit for insuring that the output therefrom does not exceed a certain level and also does not go below a certain level. The result is a wave form 14A, which indicates that the "bumps" present in the larger of the wave forms 12A have been removed by this operation of the circuit 14. The output of the aperture compensation circuit 12 is also applied to a minimum threshold circuit 16 which is a circuit which requires input signals to exceed a minimum threshold in order for an output to be obtained. The output from the minimum threshold circuit 16 resembles the wave form 16A.

The output of the minimum and maximum level clipper circuit 14 is applied directly to one of two inputs to a toggle switch circuit 18. An inverter 20, which is also connected to the output of the minimum and maximum level clipper circuit, has its output connected to the other input to the toggle switch circuit 18. The wave form of the output of the inverter circuit is represented by the wave form 20A. The toggle switch circuit is an electronic equivalent of a single pole double throw switch, the circuitry for which is well known in the art as are all the circuits which are represented by the block diagrams herein. The toggle switch circuit may consist of a flip-flop circuit whose output enables one or the other of two amplifiers and whose input drives the flip-flop circuit between its two stable states whereby one or the other of its outputs is successively enabled.

The output of the minimum threshold circuit 16 is applied to a differentiator circuit 22, which differentiates its input. The output resulting by a differentiation of the wave form 16A is represented by the wave form 22A.

The output of the differentiator circuit is applied to a clip circuit 24 which prevents the negative going pulses in the wave form 22A from passing through. Accordingly the clip circuit output, represented by the wave form 24A consists of a pulse which occurs at the leading edge of the minimum threshold input. The clip circuit output drives the toggle switch circuit.

Assume that the toggle switch circuit was last left in its state wherein it will pass the output of the inverter circuit 20 and not that of the output of the minimum or maximum level clipper circuit 14. Accordingly, when the first pulse of the output of the clip circuit is received, the toggle switch 18 is switched to the state wherein it will permit the first one of the two pulses 14A to pass therethrough. When the second pulse from the output of the clip circuit is received, the toggle switch circuit is actuated to pass the output of the inverter circuit 20. The output of the toggle switch circuit may then be represented by the wave form 18A.

It should be noted that it is readily immaterial in what state the toggle switch circuit is last left. The operation of the arrangement described is to insure that the polarity of successive pulses is inverted. It should also be noted that the low frequency or gray scale analog information, which is carried by the amplitude of the pulse signal is preserved in the output signal.

At the receiver, the wave form 18A is applied to a zero threshold detector 30, to an inverted 32, and to a toggle switch 34. The inverter inverts the wave form 18A so it has the appearance of the wave form 32A. The zero threshold detector produces a rectangular wave output which switches negative when its input goes negative and switches to zero when its input goes positive. Its output is represented by the wave form 30A. The output of the zero threshold detector is applied to a differentiating circuit 36 which provides the wave form 36A at its output having pulses at the leading and trailing edges of the wave form 30A.

The output of the differentiating circuit 36 is applied to an inverter circuit 38 and also to a clipper circuit 40. Clipper circuit 40 permits only the positive going portion of the wave form 36A to get through to an adder circuit 42. Inverter circuit 38 inverts the wave form 36A and applies the output to a clipper circuit 44. This passes only the positive going portion of the input thereto. As a result, the output of the adder circuit 42 will be two positive going pulses which occur at the leading and trailing edge of the wave form 30A. These are the switching inputs to the toggle switch 34. As a result, the toggle switch will permit the positive going portion of wave form 18A to get through, after which time it is actuated to let the positive going portion of the wave form 32A, which is the output of the inverter 32, get through. Accordingly, the output of the toggle switch 34 resembles the wave form 34A which is substantially identical with the wave form 10A derived from the facsimile copy scanner 10. This signal is applied to the facsimile writer apparatus 46, whereby the scanned signal is reproduced.

From the foregoing description, it will be seen that a modified duobinary encoding technique is employed which reduces the bandwidth required for transmitting the high frequency components of analog signals and the low frequency gray scale information is preserved by the amplitude of the pulse signals which are transmitted.

While the specific description of the invention herein is illustrated by phase inversion of successive pulses of the same polarity, this should not be construed as a limitation on the invention. Other algorithms may be employed to determine which of the successive pulses are to be phase inverted and which are not. The basic requirement for the system is that any algorithm for dictating pulse phase inversion may be employed so long as pulses of one polarity separated by a zero interval less than two minimum pulse widths long are inverted with respect to each other.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A system for reducing the bandwidth required for transmitting a succession of analog pulse signals derived by scanning copy in a facsimile system, wherein each pulse signal corresponds in duration to the length of a mark on the copy which is scanned and corresponds in amplitude to the gray level of the mark, said system comprising:

- means responsive to the successive pulses in said succession of analog pulse signals for converting the succession of analog pulse signals to a signal train wherein each successive pulse has its polarity inverted while preserving the amplitude and duration of each successive pulse, and
- means for utilizing said signal train having the polarity of each successive pulse inverted.

2. A system for reducing the bandwidth required for transmitting an analog signal train derived by scanning copy in a facsimile system, which analog signal train comprises a succession of pulses each of which has a duration corresponding to the duration of a mark on the copy which is scanned and an amplitude corresponding to the gray level of said mark;

- said system comprising single pole double throw switch means having two inputs and a single output, and
- means for connecting said single output from one to the other of said two inputs successively in response to input pulses,
- means for connecting siad analog pulse train directly to one of said switch inputs,
- inverter means,
- means for applying said analog pulse train input to said inverter means input for obtaining an inversion of said analog pulse train,
- means for connecting the output of said inverter means to the other input to said switch means,
- means for generating a pulse for each leading edge of each analog pulse in said pulse train, and
- means for applying said generated pulses to said switch means to successively switch said single pole output between its two inputs to produce an output pulse train comprising a succession of opposite polarity pulses but having the same amplitude and duration as in the analog, and
- means for utilizing said output pulse wave train.

3. A system as recited in claim 2 wherein said means for utilizing said succession of opposite polarity pulses comprises:

- switch means having two inputs and a single output,
- means for connecting said single output to each of said two inputs successively in response to input pulses,
- means for applying said output pulse train to one of said two switch means inputs,
- an inverter,
- means for applying said output pulse train to said inverter input to produce an output which is the inversion of the input,
- means for connecting the inverter output to the other of said two switch means inputs,
- means for generating pulses corresponding to the leading and trailing edge of every other pulse in said output pulse train, and
- means for applying said generated pulses to said switch means to switch its output successively between the two inputs to produce an output comprising an analog pulse train wherein all of the pulses have the same polarity.

4. A system for reducing the bandwidth required for transmitting an analog pulse signal train generated by scanning copy in a facsimile system comprising:

means for inverting the polarity of said analog pulse signal train, switch means having two inputs and a single output, means for applying said analog pulse signal train to one of said two inputs, means for applying said inverted polarity analog pulse signal train to said other of said two inputs, means for switching said single output of said switch means from one to the other of said two inputs upon the occurrence of the leading edge of successive pulses in said analog signal pulse train to produce an output comprising an analog signal pulse train wherein each successive pulse is of opposite polarity to the preceding pulse but has the same duration and amplitude as the pulse from which it is derived, and means for utilizing said switch means output.

5. Apparatus as recited in claim 4 wherein said means for utilizing the output of said switch means comprises another switch means having a first and second input and a single output, means for applying the output of said first switch means to one of the inputs to said second switch means, an inverter circuit, means for applying the output of said first switch means to said inverter circuit input, means for connecting the inverter circuit output to the other input to said second switch means, means for switching said second switch means output from the first input to the second input at the beginning of every other pulse in said pulse train received from said first switch means output, and from said second switch means second input to said second switch means first input upon the termination of every other pulse in the analog pulse train received from the first switch means output, to produce at the output of said second switch means an analog pulse train wherein all pulses have the same polarity, and means for utiliizng the output of said second switch means.

6. Apparatus as recited in claim 5 wherein said means for switching said second switch means output from the first input to the second input and from the second input to the first input respectively upon the occurrence of the leading and trailing edge of every other pulse and the analog pulse train output of said first switch means comprises zero threshold means to which the output of said first switch means is applied for producing an output pulse only in the presence of every other pulse applied to its input, means for differentiating the output of said zero threshold means, a first clipper circuit to which the output of said means for differentiating is applied for passing pulses having a single polarity, an inverter circuit to which the output of said differentiating circuit is applied for producing an output which is the inversion of its input, a second clipper circuit connected to the output of said inverter circuit, an adder circuit, means for connecting said first and second clipper circuit output to said adder circuit for producing an output comprising pulses at the leading and trailing edge of the output of said zero threshold means, and means for applying the output of said adder circuit to said second switch means for causing a switching of the output between its two inputs in response thereto.

References Cited

UNITED STATES PATENTS

| | | | |
|---|---|---|---|
| 2,867,685 | 1/1959 | Johnson. | |
| 2,957,947 | 10/1960 | Bowers | 325—38.1 |
| 3,320,536 | 5/1967 | Lockwood | 325—187 |
| 3,392,233 | 7/1968 | Houghton. | |
| 3,403,231 | 9/1968 | Slayton | 179—100.2 |

ROBERT L. GRIFFIN, Primary Examiner

H. W. BRITTON, Assistant Examiner

U.S. Cl. X.R.

178—6.6, 68; 179—15.55